United States Patent [19]

Kalnins

[11] 4,193,956
[45] Mar. 18, 1980

[54] PROCESS FOR CURING THERMOSETTING RESINS AND ELASTOMERS

[75] Inventor: John Z. Kalnins, Seaford, Australia

[73] Assignee: McPheasons Limited, Melbourne, Australia

[21] Appl. No.: 926,036

[22] Filed: Jul. 19, 1978

Related U.S. Application Data

[63] Continuation-in-part of Ser. No. 720,418, Sep. 3, 1978, abandoned.

[30] Foreign Application Priority Data

Sep. 5, 1975 [AU] Australia .................. PC3052/75

[51] Int. Cl.$^2$ .................................................. B29G 7/00
[52] U.S. Cl. ........................................ 264/27; 156/275; 264/40.6; 264/135; 264/265; 264/DIG. 46
[58] Field of Search ............... 264/27, 40.6, 105, 135, 264/265, DIG. 46; 156/275

[56] References Cited

U.S. PATENT DOCUMENTS

| | | | |
|---|---|---|---|
| 2,416,427 | 2/1947 | Bonawit | 264/DIG. 46 |
| 2,509,652 | 5/1950 | Ruslmer | 264/27 |
| 3,239,403 | 3/1966 | Williams | 156/275 |

OTHER PUBLICATIONS

"Vulcanization or Other Heat Treatment by Electrical Conduction," F. L. Yerzley, Rubber Age, Nov. 1942, pp. 133-134.

Primary Examiner—Thomas P. Pavelko
Attorney, Agent, or Firm—Sherman & Shalloway

[57] ABSTRACT

Friction or antifriction material for use in brakes, clutches, bearings and the like is shaped and cured in a mold containing a mixture of a substantially non-electrically conducting heat bondable friction or antifriction material composite with at least one electrically conductive material dispersed throughout the mixture. The mold is closed to confine the mixture and at least two electrodes are placed opposite sides of and electrically connected with the mixture. An electrical potential is applied to the electrodes to pass an electric current substantially throughout the mixture to effect resistance heating, shaping and curing of the mixture within the mold. The heat input to the mixture is monitored to control the total heat input to a predetermined value required for effecting shaping and curing of the mixture. The maximum electric current passed through the mixture can also be controlled. A metal backing plate, which may have an adhesive material coated thereon, may be placed in intimate contact with the mixture and also with one of the electrodes.

21 Claims, 5 Drawing Figures

PROCESS FOR CURING THERMOSETTING RESINS AND ELASTOMERS

This application is a continuation-in-part of copending application Ser. No. 720,418, filed Sept. 3, 1976 now abandoned.

The present invention relates to methods for shaping and curing friction and antifriction materials to form brake pads and linings, friction drive elements and couplings, bearings and bearing linings and the like. The invention is particularly aimed at methods for shaping and curing the aforesaid materials which include a thermosetting agent for bonding the material together.

In conventional methods for the purpose of shaping and curing compositions including a thermosetting bonding agent, partial or complete shaping and curing has been carried out by applying heat externally to the composition being processed. The usual conventional methods of producing friction materials, such as brake pad and lining materials can be broadly divided into two general techniques. These techniques are known as a wet mix technique and a dry mix technique. The difference between the two techniques is primarily in the form of the thermosetting agent used to bond the composition. In the wet mix technique, a liquid resin is employed which in some cases may have its viscosity adjusted by the addition of a solvent or selected solvents. In the dry mix technique, resin in dry powder form is employed, the resin usually being a two step phenolic resin. In both techniques, certain additional additives are employed for the purpose of varying the properties and characteristics of the material depending on the intended end use and duty requirements of the article produced. As an example, the following provides a typical mixture used conventionally in producing an automotive disc brake friction pad material by the dry mix technique.

| | |
|---|---|
| Asbestos 5R04 fiber | 150 parts by weight |
| Two stage phenolic resin with Hexamine added | 30 parts by weight |
| Barium Sulphate | 36 parts by weight |
| Lead Sulphide | 27 parts by weight |
| Cured cashew resin dust | 48 parts by weight |
| Brass chips (70/80 brass) | 24 parts by weight |
| | 315 total parts |

This mixture after weighing is placed in mixing apparatus, for example a Loedige Mixer, and thoroughly combined such that the materials are substantially uniformly dispersed. After mixing, the material is placed in a metal positive displacement die which is in turn placed in a hydraulic press and compressed while heat is simultaneously applied such that the composition in the die is compacted and cured. The heat is applied externally and may be provided by electrically, steam, oil or gas heated elements or platens associated with the press apparatus. The curing is thus achieved by heat conduction from the press platens or elements via the metal die to the composition material within the die. In consequence, the outside of the composition material heats first, and if the temperature used is high (about 150° C.) a skin is formed creating a barrier surrounding the remainder of the composition. Furthermore, during the curing of the composition gases develop within the material due to condensation reaction and due to moisture being present initially.

As a result of the aforesaid gas formation during the curing process, it is usual to release the pressure applied by the press at short intervals to allow escape of the gas or moisture vapour created. This pressure release is carried out at predetermined intervals and for duration times variable between 2 to 10 seconds and is necessary to avoid blisters either internally or on the surface of the product and to avoid weakened areas in the product.

Because of poor heat transfer characteristics of friction and antifriction materials formulations, the time required for curing is between 6 to 20 minutes depending on the final dimensions of the product being made. For better labour utilization, multicavity dies are used, and in some cases, as many as eighty die cavities are used in the press platen. This, however, creates its own problems in that minor variations of die dimensions from cavity to cavity and weighing errors when preparing preforms, results in the overall uniformity being not as good as would be desired. To overcome this, various methods have been used including a multistation rotary platform machine having up to twenty four single cavity presses mounted and indexing automatically. The first station being a loading station and the last being an ejection station. This type of machine results in greater uniformity and allows for automation but these advantages are offset by high capital investment, tooling costs and general maintenance costs. In both the aforementioned methods and machines it is usual for the products formed to undergo a further heat treatment which is normally called "postcure".

The second or wet mix technique using liquid resins is prepared in a somewhat similar fashion to that described above. The exceptions being that a mixer with a heating-cooling jacket is used for monitoring the viscosity of the resin in the initial stages of mixing, and in the later stages cooling is carried out to prevent pre-curing of the resin occurring. As an example two typical passenger car drum brake lining formulations are provided below:

Medium friction duo servo primary linings:

| | |
|---|---|
| 7H Asbestos | 400.00 parts by weight |
| Barium Sulphate | 33.75 parts by weight |
| Liquid cashew resin | 107.50 parts by weight |
| Hexamine | 6.50 parts by weight |
| Petroleum based solvent | 13.00 parts by weight |
| | 570.75 |

Medium friction general purpose lining with good wear life:

| | |
|---|---|
| 7H Asbestos | 300.00 parts by weight |
| Barium Sulphate | 46.00 parts by weight |
| Whiting | 96.00 parts by weight |
| Graphite powder | 15.00 parts by weight |
| Liquid cashew resin | 125.00 parts by weight |
| Hexamine | 10.00 parts by weight |
| Solvent X95 | 15.00 parts by weight |
| | 607.00 |

After the formulation is thoroughly mixed, necessarily by an intensive mixer which may include a hammer mill or disintegrator, the wet composition is conventionally pressure rolled thus compacting it and forming a continuous band of predetermined cross sectional dimensions. This strip is then cut up in required lengths and placed in stacks of "lunettes" under spring pressure and passed through a curing oven. Again, because heat is conducted through the composition material lunettes from the outside, the curing time is necessarily quite long. However, in the wet mix technique, gases developed during curing may pass through the sides of the material and thus this technique eliminates the need for bumping or pressure release. Unfortunately, the wet mix technique is only suitable for producing certain friction material products and is generally not suitable for producing disc brake friction pads.

The general nature of the products to which the present invention relates are composition materials comprising a combination in various quantities of a thermosetting agent such as a phenolic resin, a reinforcement filler such as asbestos and other materials used to vary the properties of the end product dependent upon the intended use of the product. Of this latter class of products, dry lubricants such as graphite are often included in greater or smaller quantities to raise or lower the co-efficient of friction as desired. In the case of friction products such as brake pads and the like, materials intended to increase the level of the co-efficient of friction are used. These may include soft metal chips, however, generally abrasive particles (these particles having a hardness greater than the surface against which the end product is intended to act) are not used as such particles cause excessive wear and excessive noise in operation. Generally friction and antifriction products are a dense coherent mass, the density of which can be varied by varying the quantity of thermosetting resin in the mix or by varying the applied pressure (usually in the range of 0.5 to 4.0 tons per square inch) during or prior to the curing operation. The greater the resin content, the greater the density of the end product.

The foregoing discussion provides an indication of the disadvantages of the known methods of producing friction and antifriction products including a thermosetting bonding agent. Generally all known methods involve relatively lengthy curing times and uneven curing or additional postcuring steps due to the uneven curing caused by heat conduction from the outside. Other disadvantages dependent on the actual process used include that the processes are labour intensive lacking in automation, require pressure release during curing and require involved machinery which is expensive and often requires constant maintenance attention.

The objective of the present invention is to provide a quick and efficient method of shaping and curing dense composition materials adapted for use in friction and antifriction products which method substantially lessens the time required for shaping and curing the aforesaid composition materials.

A further objective of the present invention is to provide a method of curing and shaping composition materials for friction and antifriction products which overcomes the need for pressure release of compressive forces during curing of the material.

A still further objective of the present invention is to provide a method of curing and shaping composition materials which is generally suitable for use in producing all forms of friction and antifriction products when the material composition includes a thermosetting bonding agent regardless of whether the thermosetting agent is a liquid or a dry powder.

According to the present invention there is provided a method of shaping and curing a friction or antifriction material for use in brakes, clutches, bearings and the like comprising the steps of introducing a mixture of a substantially nonelectrically conducting heat bondable friction or antifriction material composite with at least one divided electrically conductive material uniformly dispersed throughout the mixture into an insulated mold having a predetermined shape; closing the mold to confine said mixture; locating at least two electrodes on opposed sides of the mixture and electrically connected with the mixture; applying an electrical potential to said electrodes to pass an electric current substantially throughout said mixture to thereby effect resistance heating, shaping and curing of the mixture within the mold; and monitoring the energy input to said mixture to control the total energy input to a predetermined value required for effecting shaping and curing of the mixture within the mold independently of electrical resistance variations of said mixture. It is to be appreciated that the electrical current may be AC or DC and may be direct or induced.

Resistance heating of the mixture results in the raising of the temperature of the composition at a uniform rate throughout in contrast to conventional methods where uniformity is restricted by thermal conductivity. The electrically conductive material is conveniently finely divided metal powder or fibre. Suitable metals include copper, iron and zinc, however other metals can be used. Conveniently the particle size of the metal powders or fibres ranges from 20 to 100 microns. Alternatively, or in addition to the metal powder or fibre, graphite in finely divided form may be used as the electrically conductive material. Conveniently the graphite may have a particle size of the order of 2 to 30 microns. It should be appreciated that both the metal particles and/or the graphite particles have a dual purpose of providing the necessary electrical conductivity for the mix as a whole as well as providing an effect on the final performance characteristics of the end product.

On a microscopic scale, the points of heat generation within the material occur at the most advantageous locations, that is at the interfaces between the conductive and non-conductive materials. Furthermore, in accordance with the method of the present invention, the electrical resistance of the mixture decreases quite rapidly over a short period of time such that for any particular electrical potential applied to the electrodes results in a rapid increase in electric current with a consequent increase in heat generated within the mixture. The result of this is that heating occurs uniformly and at an increasing rate such that shaping and curing occurs very quickly (of the order of 5 to 60 seconds). The speed of the process enables, for brief periods of time, to reach higher temperatures within the material than can be applied by conventional methods which rely on heat conduction, however, to avoid excessive heating and consequent decomposition and damage, the present invention proposes monitoring the energy input to the mixture to control the total energy input to a predetermined value theoretically indicative of complete curing of the mixture. The uniform heating and the possibility of increased local temperatures enables in some instances, the elimination of a postcuring step, which in prior art methods has been a more or less compulsory step.

Because of the speed of curing in accordance with the present invention, it was found impractical to release the pressure of confinement of the mixture within the mold to release water vapour and other gases formed during the curing process. It was found that fluctuating the current levels between limits which would have occurred by fluctuating pressure in conventional molding techniques resulted in a sounder product than would have been achieved by applying a continuous value of current being the mean of the aforementioned limit levels of fluctuating current. Thus in a preferred aspect of the present invention, current variation or pulsing throughout the mixture is achieved by pulsing or varying the applied potential to the electrodes. The current might for example, be varied between a few amperes up to 500 amperes. Advantageously, in addition to fluctuating current levels throughout the mixture, the composition mixture may include small quantities of moisture and/or gas scavengers, the purpose of which is to absorb gas and vapour produced during curing of the mixture. Quicklime has been found satisfactory in finely divided particle form with a particle size of the order of 1-3 microns and in quantities ranging from 0.2-1% by weight of the total mixture. In addition, it is believed that other materials such as Silica Gel, activated charcoal and activated alumina would be suitable for use as moisture and/or gas scavengers.

The electrodes for applying electric potential to the mixture are conveniently placed to provide a current disposition substantially throughout the complete mixture. More than one pair of electrodes may be provided with any pair of multiples of pairs may be connected to different power sources having different potential and current values, the values and the actual connecting network being specific for each shape and/or formulation and the end product requirements.

The actual form of the electrodes is not essential to the invention but is primarily determined by the shape of the end product. The electrodes may take the form of two electrically conductive plates placed on opposite sides of the material. They can also take the form of segment elements placed around the material to be cured.

The actual voltage or current required to heat and cure the composition will naturally by determined by the resistance of the composition itself and the end use requirements of the product. For some material compositions or products it is advantageous to have the conductive electrodes controlled within a specified temperature range. This temperature range will be specific for each material composition or formula. One temperature range found to be particularly satisfactory, however, is from 0° C. to 500° C.

In one preferred aspect of the present invention, a rigid metal backing plate is simultaneously bonded to the mixture during curing and shaping of the mixture. This is particularly important in the production of automotive disc brake pads with a metal backing plate. In this embodiment it has been found important to heat the backing plate prior to bringing the plate into contact with the mixture in the mold being shaped and cured. The heating of the backing plate may be achieved by physically heating one or more of the electrodes against which the backing plate is brought into contact. Alternatively heating of the backing plate may be achieved by providing separate pre-heating apparatus. If the backing plate is not heated, condensation of volatile products of the curing cycle on a cold backing plate inhibits bonding taking place. Furthermore, backing plates will often be pre-coated with a heat activatable adhesive and the pre-heating of the backing plates has the dual purpose of softening the adhesive ready for bonding with the friction material being cured. Conveniently, the mixture within the mold is pressed against the heated backing plate for a predetermined period of time prior to passing the electric current through the backing plate, the adhesive and the mixture in the mold to effect shaping and curing of the mixture. Advantageously, after the necessary quantity of heat energy has been absorbed by the mixture and the electric current has been turned off, pressure is maintained urging the mixture against the backing plate for a further predetermined dwell period prior to ejecting the completed product from the mold. The dwell periods in the absence of electric power are important in achieving a satisfactory bond between the friction material and the backing plate.

Whether or not compression of the mixture within the mold is necessary will depend to some extent on the composition itself, the shape and dimensions of the product and the end use of the finished product. It has, however, been determined that the electric resistance of composition mixture varies quite considerably with the pressure applied and generally some compression is preferred to establish current flow. The actual pressure applied may be at least 0.5 tons per inch$^2$, however, this may be varied up to several tons per square inch.

A preferred embodiment of the invention will now be described by way of example only with reference to the accompanying drawings in which.

Figure 1:
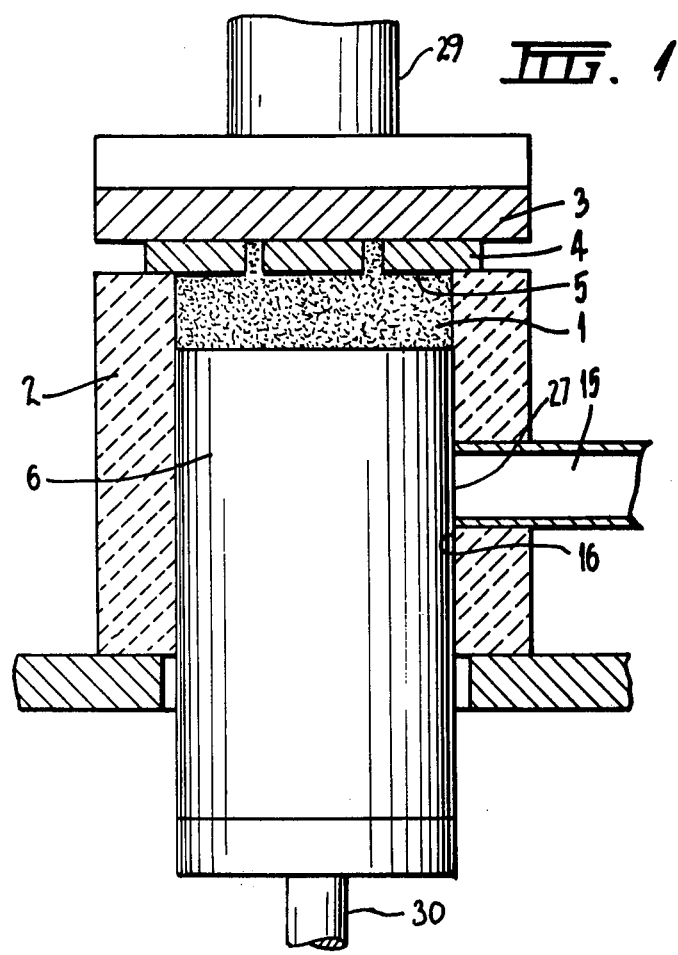
FIG. 1 illustrates a cross-sectional side elevation of part of an apparatus used in the process of the invention for the formation of an automotive disc brake pad comprising a friction material bonded to a metal backing plate.

Referring to FIG. 1, the friction material composition 1, typically in dry powder form, is introduced into the cavity of a die or mold 2, the amount of composition being controlled volumetrically or by weighing. The mold 2 consists of electrically non-conductive or insulating material. A top electrode 3 which is heated and in the form of a platen, is in contact with a metal backing plate 4, pre-coated with adhesive 5, to which the composition is to be bonded. A bottom electrode 6 in the form of a piston or punch is adapted to reciprocate in the die to compress the material. The operation consists of filling the mold 2 through the passage 15 via an opening 27 in the mold wall, closing the mold with the bottom electrode 6 to simultaneously compress the composition in the mold and close the opening 27, and then passing an electric current throughout the composition 1 by applying an electric potential to the electrodes 3 and 6. Compression is usually applied prior to passing an electric current through the composition for a predetermined period and is maintained during curing of the composition. Subsequent to curing the compression is maintained for a further period of time prior to ejection of the completed friction material bonded to the backing plate.

Figure 2:
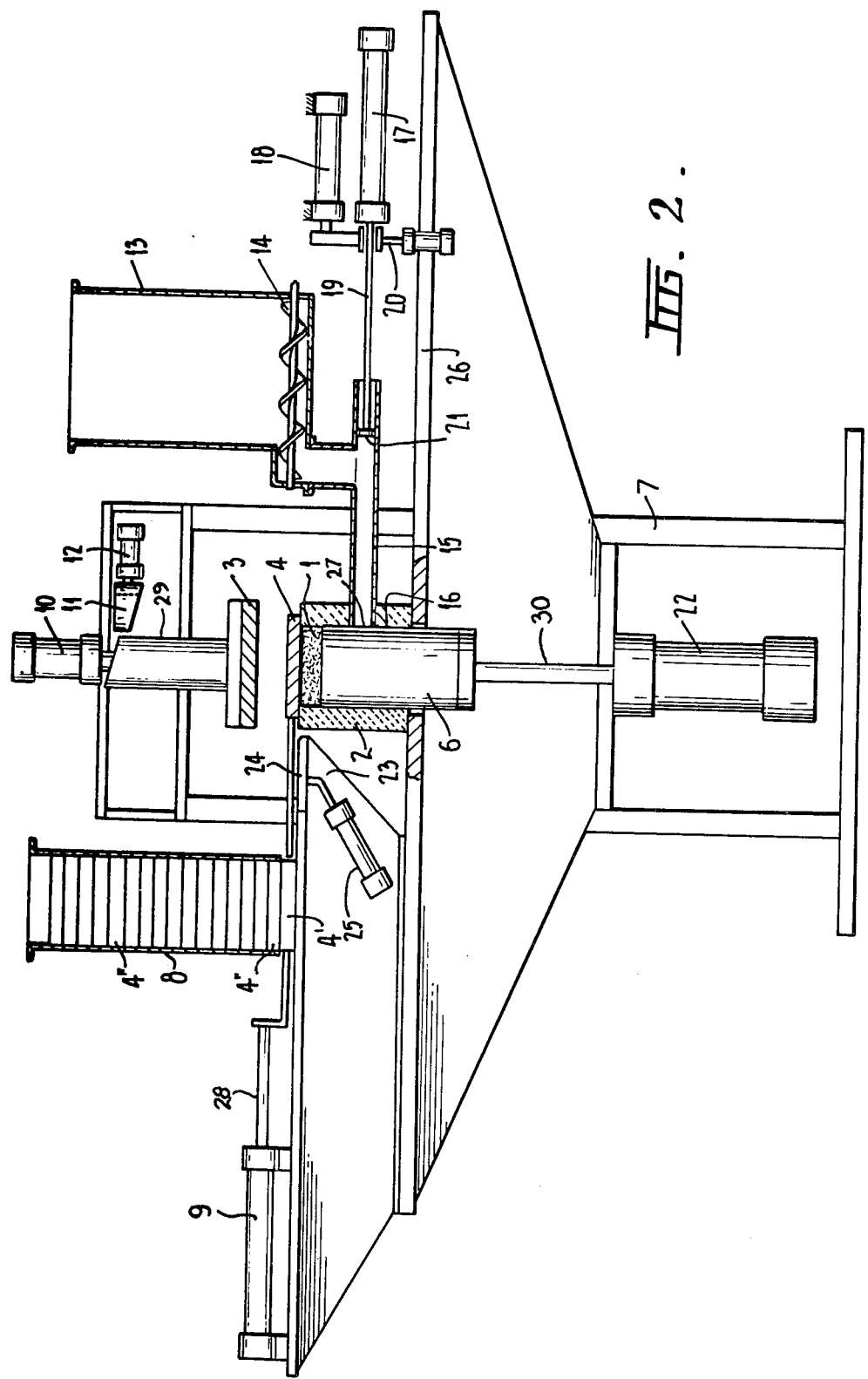
FIG. 2 illustrates a cross-sectional side elevation of the whole apparatus of FIG. 1.

Turning now to FIG. 2, the mold-electrode-punch assembly of FIG. 1 is mounted on a tool support structure 26 which in turn is attached to the main-press frame 7 enabling the material 1 to be compressed between the punch 6 and the top platen 3, which also act as the two electrodes for the passage of electric current throughout the material 1. Further, a stack of metal backing plates 4', 4" etc are held in a magazine 8 and are successively fed by means of a hydraulically operated cylinder 9 and push rod member 28 into position over mold 2. The top platen 3 is movable to close the mold cavity and to eventually allow ejection of the finished product. Movement of the top platen 3 is achieved by means of hydraulically operated cylinder 10 and a connected rod member 29 having a wedge surface which is engageable by a wedge 11 moved by hydraulic cylinder 12 to lock the top platen in its position closing the mold cavity. The cylinder 10 exerts a relatively light pressure so as not to transfer the main pressing load to the tool support 26 for the tooling, and it is only when molding takes place and after the locking by the wedge 11 that a substantial force is carried by the press structure. At no time, however, is a heavy force carried by the structure 26.

A material storage hopper 13 contains the composition (which has previously been formulated and thoroughly and uniformly mixed) for the formation process. The composition is fed by means of a screw feeder 14 into the entrance of a compacting cavity 15 in the form of a passage extending into the mold and opening thereinto via opening 27. The compacting cavity 15 is closed off by the side wall 16 of the punch during the curing cycle, and while this is happening an air actuated ramming cylinder 17 reciprocates a rod 19 and ram 21 so as to compact the material in the compacting cavity until it has reached an adequate predetermined volume for the next operation wich involves transfer of a measured amount into the mold cavity. The forward stroke of the ramming cylinder 17, being limited by the material in the cavity 15, actuates a limit switch through a time delay to indicate a sufficient volume has been achieved. A clamp 20 then grips the rod 19 of the cylinder 17, and a hydraulic cylinder 18 is actuated to move the rod 19 through a fixed displacement set by limit switches on the cylinder 18. This results in a measured volume of compacted material being transferred to the mold cavity after which hydraulic cylinder 22 via connecting rod 30 connected to punch 6 moves the punch upwards to compress the material to be moulded against the backing plate 4 under the platen 3.

The platen 3 may be heated so that the backing plate is brought up to sufficient temperature to allow better adhesion of the molded material 1 by the adhesive 5. During compression an electric current is passed between the punch 6 and the platen 3, typically using DC with the current level controlled and pulsed according to the requirements of the curing operation and the properties of the material being moulded. At the conclusion of the resistance heating and curing cycle, the upper platen 3 opens after removal of the wedge 11 by cylinder 12 and the punch 6, moved by cylinder 22, follows through to eject the finished molding above the upper surface of the mold 2.

The cylinder 9 is still in the forward position after loading the backing plate 4 used in this curing cycle and the transfer fingers attached to its pusher rod 28 are still engaging the backing plate. The cylinder 9 now moves backwards, gripping the finished molding which is discharged through a trap door 24 opened by a hydraulic cylinder 25.

While the compression portion of the molding cycle was taking place, the next charge of material was being compacted by the ramming cylinder 17 as described earlier, and after ejection of the finished molding the cycle is repeated with another backing plate being loaded, closing of the upper platen 3 and then transfer again of the next compacted charge to the molding cavity.

The same general procedure could be employed for other types of brake elements where the friction material is also bonded to a metal backing plate. Likewise, anti-friction materials for sliding and wear-resistant applications may be similarly cured and, if desired, simultaneously bonded to a backing plate.

The backing plate may be steel or any other suitable metal, however, this is not essential to the performance of the invention. Pads and friction material can be formed without a backing plate, segments for drum brakes, for example, may be produced between two or more electrodes with the friction material being entirely separable from these electrodes after completion of the cycle.

Figure 3:
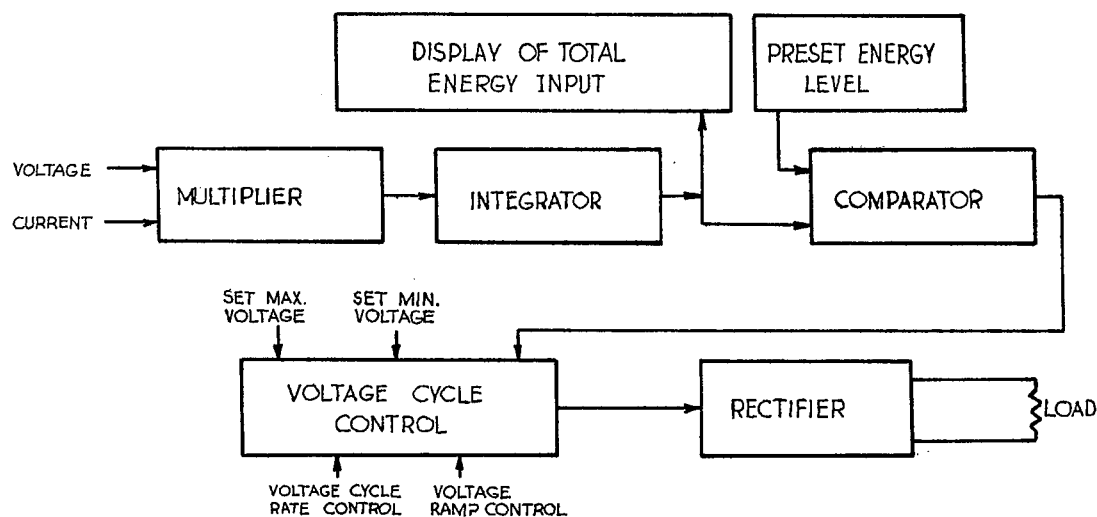
FIG. 3 illustrates schematically in block diagram form, a control means for effectively monitoring the energy input to the friction material to limit the total energy input to a predetermined level.

Referring now to FIG. 3 there is illustrated schematically in the block form the control means for achieving monitoring and control of the energy input to a predetermined quantity. FIG. 3 also illustrates diagrammatically the power unit circuitry which provides not only control of total energy input in the cycle but also allows for voltage/current cycling during the cycle. The voltage applied to and the current resulting in the mixture (Load) are constantly monitored and fed into a Multiplier. The output level of the Multiplier is therefore proportional to the instantaneous power consumption. The output of the Multiplier is then fed into an Integrator which integrates the power output with respect to Time and therefore the output of the Integrator represents total energy consumed by the Load. The desired energy level input (in kilojoules or watt-seconds) is preset using a potentiometer and Display and this level is constantly compared by means of a Comparator with the output of the Integrator to turn the power off when the energy level reaches the preset level. The preset level is in effect, the total energy required to achieve a desired level of cure in the mixture (Load) on the assumption that the cycle is so short that heat losses by conduction are insignificant.

Figure 4:
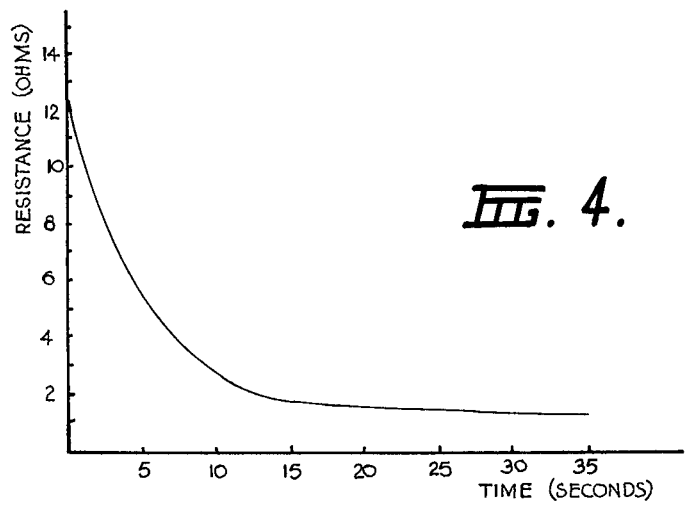
FIG. 4 represents in graph form, a typical variation of resistance of the friction material mixture during the curing cycle.
Figure 5:
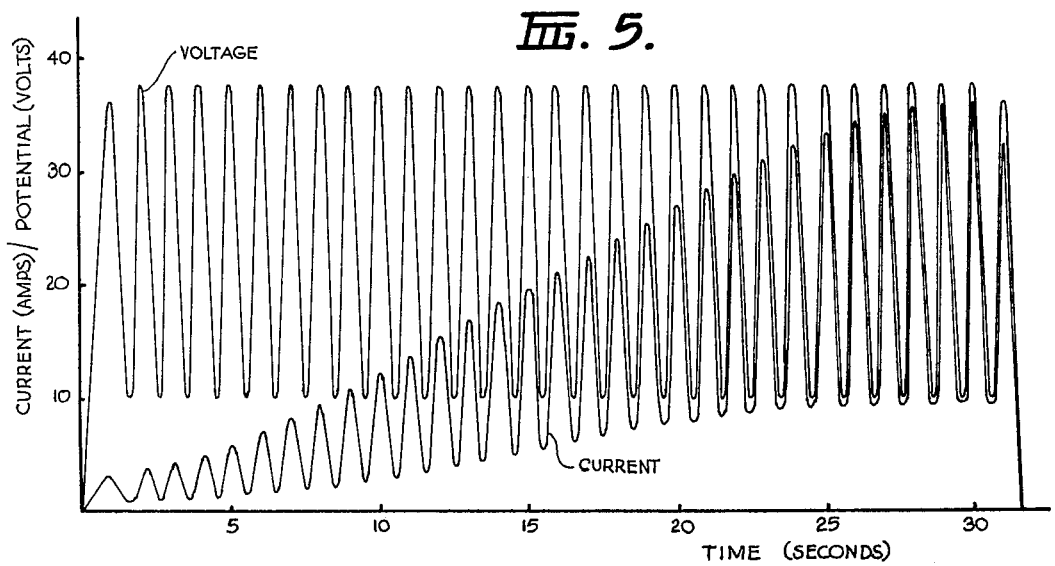
FIG. 5 represents a graph form, a typical variation of current and voltage during the curing cycle.

FIG. 3 also shows the control means for pulsing the applied voltage. The input to the mixture (Load) is passed through a voltage cycle control. The cycle control includes means for pulsing the voltage, pre-set maximum and minimum voltage levels, means for controlling the rate of voltage increase in any one pulse (Voltage Ramp Control), and means for controlling the frequency of voltage pulses (Voltage Cycle Rate Control). The output of the Voltage Cycle Control is subsequently rectified to a pulsed Direct Current flow through silicon controlled rectifiers and then applied to the mixture (Load). In addition a maximum current control limiter could be provided. FIG. 4 of the accompanying drawings illustrates the variation of the electrical resistance in the mixture (Load) during a curing cycle while FIG. 5 illustrates the variation of voltage and current during a curing cycle. It will be observed that resistance decreases initially quite rapidly while current flow, in response thereto, increases generally in phase with the pulsed applied voltage.

The following provides an example of materials which may be included in a friction element according to the present invention:

|  | By Weight |
|---|---|
| Asbestos | 0–60% |
| Resin (thermosetting) | 0–60% |
| Copper powder or fibers | 0–75% |
| Iron powder or fibers | 0–75% |
| Zinc powder or fibers | 0–75% |
| Graphite | 0–50% |
| Carbon Black | 0–50% |
| Barytes | 0–80% |
| Calcite | 0–50% |

A more specific composition, suitable for use as a friction element, is as follows:

|  | By Weight |
|---|---|
| 6D Asbestos | 16.1% |
| Iron powder | 29.5% |
| Copper powder | 14.8% |
| Barytes | 6.0% |
| Phenolic resin | 12.1% |
| Zircon powder | 6.0% |
| Graphite | 15.6% |
|  | 100.0% |

The following provides examples in accordance with the present invention including two typical formulations which are initially weighed and combined in an intensive mixing apparatus such as a Loedige Mixer. The formulations are:

| Ingredients | Example A Parts by Weight | Example B Parts by Weight |
|---|---|---|
| Phenolic Resin | 146 | 146 |
| Asbestos Grade 5R | 430 | — |
| Asbestos Grade 6D | — | 430 |
| Graphite (particle size 3–25 microns) | 400 | 400 |
| Lead Sulphide (particle size 38–75 microns) | 450 | 400 |
| Talc (particle size 80–120 microns) | 450 | 400 |
| Ground cured rubber crumb (particle size 180–850 microns) | 90 | 90 |
| Ground cured cashew resin particles (sold as "Friction Dust" particle size 75–425 microns) | 60 | 60 |
| Copper powder (particle size 38–75 microns) | 30 | 30 |
| Barytes (particle size 63 microns and finer) | — | 150 |
| Quicklime (particle size approx. 1–3 microns) | 100 | 100 |
|  | 2156 | 2206 |

After thorough and uniform mixing the formulated compositions are introduced in measured quantities as previously described into molding apparatus according to the invention. The mixture is then subjected to a molding pressure of approximately 0.75 tons/inch$^2$.

It has been found that the resistance varies according to the pressure applied as well as depending on the actual formulation. As an example the following variations occur with pressure:

| Applied Pressure (tons/inch$^2$) | Resistance (ohms) |
|---|---|
| 0.114 | 200,000 |
| 0.228 | 2,000 |
| 0.342 | 400 |
| 0.456 | 120 |
| 0.570 | 60 |
| 0.684 | 32 |
| 0.798 | 20 |
| 0.912 | 11.5 |
| 1.027 | 10.2 |
| 1.14 | 8.5 |

The value of 0.75 tons/inch$^2$ provides a satisfactory electrical characteristic. An electric current is then passed through the mixture to effect shaping and curing. The total energy input varies with the size and shape of the friction material as well as its formulation, but the following values are typical for the above two formulations in three different automotive disc pad applications:

| Friction Material | Typical Electrical Energy Input in Kilojoules | |
|---|---|---|
|  | Formulation Example A | Formulation Example B |
| Disc Pad 1 | 32–34 | 28–30 |
| Disc Pad 2 | 32–36 | 27–30 |
| Disc Pad 3 | 24–27 | 22–24 |

The exact electrical energy input may be determined by experimentation for each application in order to achieve a sound end product and desired friction performance characteristics. As described previously, the voltage and current are cycled during the progress of curing. A typical cycle time for the shaping and curing a disc pad material while bonding such a material to a backing plate is as follows:

| Loading mold cavity | 3–5 | seconds |
|---|---|---|
| Dwell (under pressure and without power to allow conductive heating of the backing plate) | 5–8 | seconds |
| Cure (with electric power on) for resistance heating | 15–30 | seconds |
| Dwell (under pressure and without power) | 10–12 | seconds |
| Eject and return to start | 2–5 | seconds |
| Total Cycle | 40–60 | seconds |

Typical final resistance values for finished cured and ground disc pads produced in accordance with the present invention have been found to have significantly lower values than similar formulations produced by conventional techniques. A disc pad produced from formulation A measured across the whole pad area between flat plates could be of the order of 12–14 ohms whereas a disc pad produced from formulation B could be of the order of 35–60 ohms. Typical values for conventional pads of similar shape and configuration could have resistance values in the range of 4000 ohms up to 8,000,000 ohms. The braking performance of disc pads made in accordance with the present invention show life, fade resistance and braking effectiveness at least as good as conventionally made pads and also show low disc wear.

The present invention may also be applied to thermosetting molding materials and an example of such a composition is as follows:

|  | By Weight |
| --- | --- |
| Thermosetting resin | 5–80% |
| Carbon Black (conductive) | 5–80% |
| Cotton or asbestos fiber | 0–50% |

Other commonly used modifying materials may also be included, examples being kaolin, wood flour, nut shell powders.

The method can also be used for some elastomeric compositions such as rubber products which are modified to provide sufficient conductivity to allow heating by electrical resistance. Rubbers are not sufficiently conductive of themselves but conductive materials can be added to the composition.

The following represents a typical composition of this type:

|  | By Weight |
| --- | --- |
| Elastomer | 10–90% |
| Carbon Black (conductive) | 0–70% |
| Zinc Oxide | 0–20% |
| Antioxidant | 0–5% |
| Crosslinking ingredients | 0–5% |
| Various accelerators | 0–5% |

I claim:

1. A method of shaping and curing a friction or antifriction material for use in brakes, clutches, bearings and the like comprising the steps of:
   (a) introducing a mixture of a substantially non-electrically conducting heat bondable friction or antifriction material composite with at least one divided electrically conductive material uniformly dispersed throughout the mixture into an insulated mold having a predetermined shape;
   (b) closing the mold to confine said mixture;
   (c) locating at least two electrodes on opposed sides of the mixture and electrically connected with the mixture;
   (d) applying an electrical potential to said electrodes to pass an electric current substantially throughout said mixture to thereby effect resistance heating, shaping and curing of the mixture within the mold; and
   (e) monitoring the energy input to said mixture to control the total energy input to a predetermined value required for effecting shaping and curing of the mixture within the mold independently of electrical resistance variations of said mixture.

2. A method according to claim 1, wherein the conductive material comprises a metal powder or fibre.

3. A method according to claim 2, wherein the particle size of the metal powder or fibre is in the range of 20 to 100 microns.

4. A method according to claim 1, wherein the electric current passing throughout the mixture is varied or pulsed.

5. A method according to claim 4, wherein the electric potential applied to said mixture is varied or pulsed to effect said variation or pulsing of said electric current.

6. A method according to claim 1, wherein the electrically conductive material comprises a combination of finely divided graphite and metal powder or fibre.

7. A method according to claim 6 wherein the particle size of said graphite is in the range of 2 to 30 microns.

8. A method according to claim 1, wherein the heat bondable material composite includes a thermosetting resin.

9. A method according to claim 1, wherein a first one of the electrodes is movable between positions opening or closing the mold.

10. A method according to claim 9, wherein said first movable electrode is further movable to compress the mixture within the mold after moving to said position closing the mold.

11. A method according to claim 9, wherein a second one of said electrodes arranged on an opposed side of said mixture to said first movable electrode is also movable between positions opening or closing the mold.

12. A method according to claim 1, comprising the further step of placing a metal backing plate in intimate contact with the mixture introduced into the mold whereby the electrical current passing through the mixture also passes through the backing plate.

13. A method according to claim 12, wherein a heat activatable adhesive is applied to the backing plate on the surface placed in intimate contact with the mixture, and said backing plate is heated to soften said heat activatable adhesive prior to passing said electrical current through the backing plate, the heat activatable adhesive, and the mixture.

14. A method according to claim 12, including the steps of pressing the mixture in said mold against the backing plate adhesive for a first predetermined period of time prior to passing an electric current therethrough, thereafter passing the electric current through the backing plate, the adhesive and the mixture in said mold.

15. A method according to claim 14, wherein the mixture in said mold is pressed for a second predetermined period of time against said backing plate without electric current passing therethrough, after shaping and curing of said mixture.

16. A method according to claim 1, wherein the mixture includes moisture and/or gas scavengers.

17. A method according to claim 16 wherein the moisture and/or gas scavengers are selected from the group of quicklime, silica gel, activated charcoal and activated alumina.

18. A method according to claim 16 wherein the moisture and/or gas scavengers included in the mixture comprise between 0.2 and 1% by weight of the total mixture.

19. A method according to claim 1, wherein the mold is arranged such that the shape of the mixture confined therein has a non-uniform thickness and said electrodes are segmented whereby different pairs of said electrodes have different electric potentials and current values applied thereto.

20. A method according to claim 1 wherein the mixture in said mold is compressed prior to passing said electric current therethrough.

21. A method according to claim 20, wherein the compressive force applied to said mixture is at least 0.5 tons/in$^2$.

* * * * *